(12) United States Patent
Choi

(10) Patent No.: US 6,781,731 B2
(45) Date of Patent: Aug. 24, 2004

(54) MICROMIRROR DEVICE AND PROJECTOR EMPLOYING THE SAME

(75) Inventor: Soon-cheol Choi, Gyeonggi-do (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 57 days.

(21) Appl. No.: 09/962,311

(22) Filed: Sep. 26, 2001

(65) Prior Publication Data

US 2002/0122159 A1 Sep. 5, 2002

(30) Foreign Application Priority Data

Mar. 2, 2001 (KR) ........................................ 2001-10739

(51) Int. Cl.[7] .............................................. G02B 26/08
(52) U.S. Cl. ...................................... 359/223; 359/224
(58) Field of Search ................................ 359/290, 291, 359/321, 223, 224, 636, 639, 634, 635; 353/31, 98, 99

(56) References Cited

U.S. PATENT DOCUMENTS

| 5,083,857 A | 1/1992 | Hornbeck |
| 5,312,513 A | 5/1994 | Florence et al. |
| 5,920,417 A | 7/1999 | Johnson |
| 6,028,689 A | 2/2000 | Michalicek et al. |
| 6,198,180 B1 * | 3/2001 | Garcia ........................ 310/36 |
| 6,224,216 B1 * | 5/2001 | Parker et al. ................. 353/31 |
| 6,469,821 B2 * | 10/2002 | Bartlett et al. .............. 359/292 |

FOREIGN PATENT DOCUMENTS

| DE | 25 42 233 | 4/1976 |
| DE | 298 854 A5 | 3/1992 |
| DE | 196 15 329 A1 | 4/1997 |
| DE | 19712201 A1 | 10/1998 |
| EP | 0 949 527 A1 | 10/1999 |
| GB | 2 289 773 | 11/1995 |
| WO | WO 00/55666 | 9/2000 |
| WO | WO 02/75426 | 9/2002 |

* cited by examiner

Primary Examiner—Georgia Epps
Assistant Examiner—Richard Hanig
(74) Attorney, Agent, or Firm—Staas & Halsey LLP

(57) ABSTRACT

A projector includes a light source emitting a light beam and a light beam splitting unit splitting the light beam from the light source according to a wavelength region of the light beam and transmitting and/or reflecting the light beam split at different angles. A micromirror device forms an image by independently pivoting a micromirror in a predetermined direction and angle and controlling the micromirror to selectively reflect the light beam, the micromirror tilting with respect to rotation axes. A projection lens unit magnifies and transmits an incident light beam from the micromirror devices to proceed to a screen to form the image.

45 Claims, 7 Drawing Sheets

MICROMIRROR DEVICE AND PROJECTOR EMPLOYING THE SAME

CROSS-REFERENCE TO RELATED APPLICATIONS

This application claims the benefit of Korean Application No. 2001-10739, filed Mar. 2, 2001, in the Korean Industrial Property Office, the disclosure of which is incorporated herein by reference.

BACKGROUND OF THE INVENTION

1. Field of the Invention

The present invention relates to a micromirror device for driving a micromirror to change a path of reflection of an incident light, and more particularly to a micromirror device in which a micromirror tilts with respect to a plurality of rotation axes so that the micromirror can function as a color switch, and to a projector employing the micromirror device.

2. Description of the Related Art

In general, a micromirror device includes a plurality of micromirrors driven by electrostatic forces. The micromirror device changes a path of reflection of incident light by changing an angle of reflection according to the tilt angle or tilt direction of each micromirror. The micromirror device is used in an image display device of a projection television and an optical scanning apparatus of scanners, photocopiers, and facsimiles. In particular, when the micromirror device is adopted in an image display device, the micromirror device includes as many micromirrors as a number of pixels of the image display device, where the micromirrors are arranged in two dimensions. When generating an image, the angle of reflection of incident light is determined by independently driving each micromirror according to a video signal and with respect to each pixel.

Referring to FIG. 1, a conventional micromirror device 5 includes a substrate 10, an address electrode 11, and a landing electrode 12 formed on the substrate 10. A pair of posts 15 supports a micromirror 16 and a torsion hinge 14 is connected between the micromirror 16 and each post 15 for receiving torsion when the micromirror 16 tilts. A voltage is applied to the landing electrode 12 to control the tilt angle or tilt direction of the micromirror 16. Here, the micromirror 16 is driven by electrostatic attraction generated by a difference in electric potential between the address electrode 11 and the micromirror 16.

FIG. 2 shows a projector employing the conventional micromirror device. In particular, a light source 20 emits a beam, which is condensed by a first condenser 22 and input to a color wheel 25. Here, the color wheel 25 is rotated at a high speed to realize color using the micromirror 16 of FIG. 1 (not shown), so that a color image is realized in a manner in which a light of R (red), G (green) and B (blue) colors sequentially illuminates the micromirror 16. The beam passing through the color wheel 25 is input to a DMD (digital micromirror device) chip 30 where the micromirror devices 5 of FIG. 1 (not shown) corresponding to a number of pixels of a screen 35 are arranged via a second condenser 27. When each of the micromirrors 16 tilts at a predetermined angle driven by the DMD chip 30 according to a video signal with respect to each pixel of the screen 35, a color beam corresponding to each pixel is reflected at an appropriate angle and proceeds towards a projection lens 33. A beam enlarged by the projection lens 33 is focused on the screen 35.

In this case, because the color wheel 25 rotates at high speed, noise is generated and stability is deteriorated due to the mechanical motion of the color wheel 25. Also, light is lost at a boundary portion of the color wheel 25. To reduce the loss of light, light should be focused to have a very small beam size. However, because the light source 20 is not a point light source and has a certain volume, there is a limit in reducing the size of the beam and, thus, the loss of light is unavoidable. Furthermore, because the unit price of the color wheel is very high, the total cost of manufacturing increases.

SUMMARY OF THE INVENTION

Various objects and advantages of the invention will be set forth in part in the description that follows and, in part, will be obvious from the description, or may be learned by practice of the invention.

To solve the above and other problems, it is an object of the present invention to provide a micromirror device in which a micromirror tilts with respect to a plurality of rotation axes so as to function as a color switch, and a projector employing the micromirror device.

Accordingly, to achieve the above and other objects, there is provided a micromirror device for driving a micromirror, which includes a substrate; electrodes on the substrate; first posts; and a support frame supported by the first posts and tilting with respect to rotation axes using portions supported by each of the first posts as hinge points.

In the present invention, the electrodes are symmetrically arranged in pairs on opposite sides of the substrate, each pair of electrodes facing each other. The micromirror tilts with respect to two rotation axes and the rotation axes are perpendicular to each other.

The support frame includes a second post protruding from the support frame supporting the micromirror; a center portion supporting the second post; and two pairs of springs connecting the first posts with the center portion. The two pairs of springs are arranged to be symmetrical with respect to each other and have zigzag shapes to be twisted and elastically deformed when the micromirror tilts.

Also, to achieve the above and other objects, there is provided a projector including a light source emitting a light beam; a light beam splitting unit splitting the light beam from the light source according to a wavelength region of the light beam and transmitting and/or reflecting the light beam split at different angles; micromirrors; micromirror devices forming an image by independently pivoting each of the micromirrors in a predetermined direction and angle and controlling the micromirrors to selectively reflect the light beam, each of the micromirrors tilting with respect to rotation axes; a screen; and a projection lens unit magnifying and transmitting an incident light beam from the micromirror devices to proceed to the screen to form the image.

In the present invention, that each of the micromirror devices includes: a substrate; electrodes on the substrate; first posts; a support frame supported by the first posts and tilting with respect to the rotation axes using portions supported by each of the first posts as hinge points; a second post protruding from the support frame; and a micromirror supported by the second post and tilting by interaction with the electrodes.

Also, to achieve the above and other objects, there is provided a micromirror device including: a substrate including a built-in SRAM: electrodes on the substrate to tilt the micromirror; at least three posts on the substrate; and a support frame supported by the posts, wherein the micromirror is tilted in four directions by interaction with the electrodes.

A micromirror device is also provided, including: a micromirror receiving a red light beam, a green light beam, and a blue light beam at different angles, and a projection lens unit selectively receiving and displaying each of the red, green, and blue light beams according to incident angles of each of the red, green, and blue light beams and a tilt angle of the micromirror corresponding to each of the incident angles to realize color.

A micromirror device for driving a micromirror is also provided, the micromirror device including: a substrate; electrodes on the substrate; and a support frame supported by tilting with respect to rotation axes, wherein the micromirror tilts in four directions by applying a voltage to any one of the electrodes; and a projection lens unit selectively displaying red, green, and blue colors according to a direction of tilt of the micromirror.

These together with other objects and advantages, which will be subsequently apparent, reside in the details of construction and operation as more fully hereinafter described and claimed, reference being had to the accompanying drawings forming a part hereof, wherein like numerals refer to like parts throughout.

BRIEF DESCRIPTION OF THE DRAWINGS

The above objective and advantages of the present invention will become more apparent by describing in detail a preferred embodiment thereof with reference to the attached drawings in which.

DETAILED DESCRIPTION OF THE PREFERRED EMBODIMENTS

Figure 1:
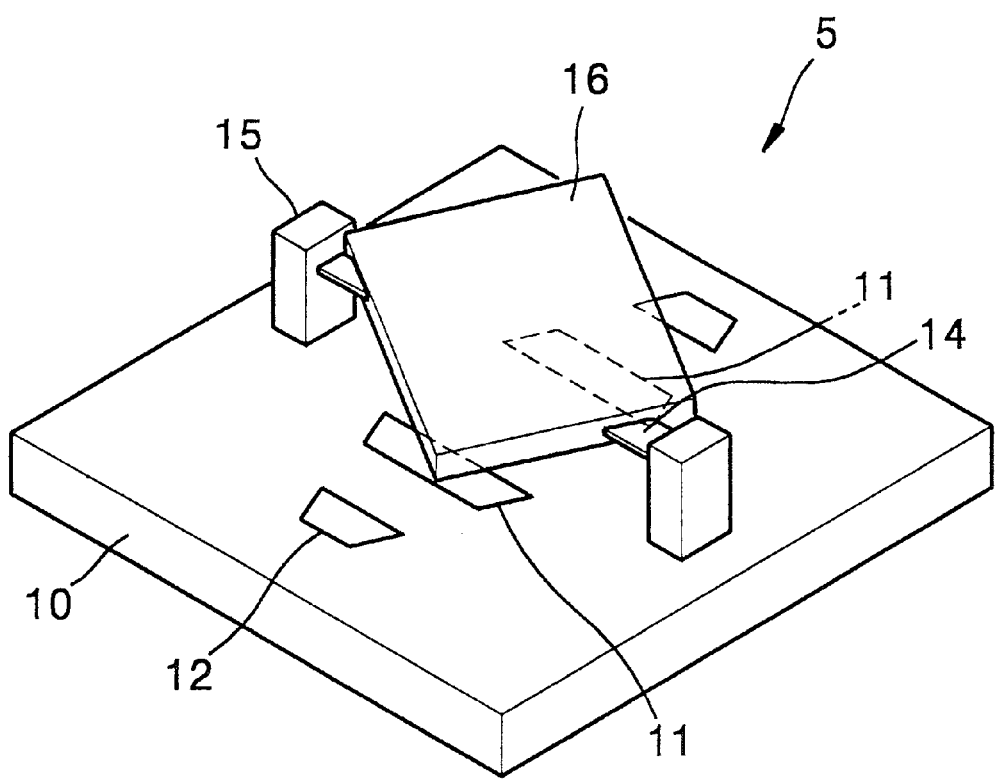
FIG. 1 illustrates a schematic view of a conventional micromirror device.
Figure 2:
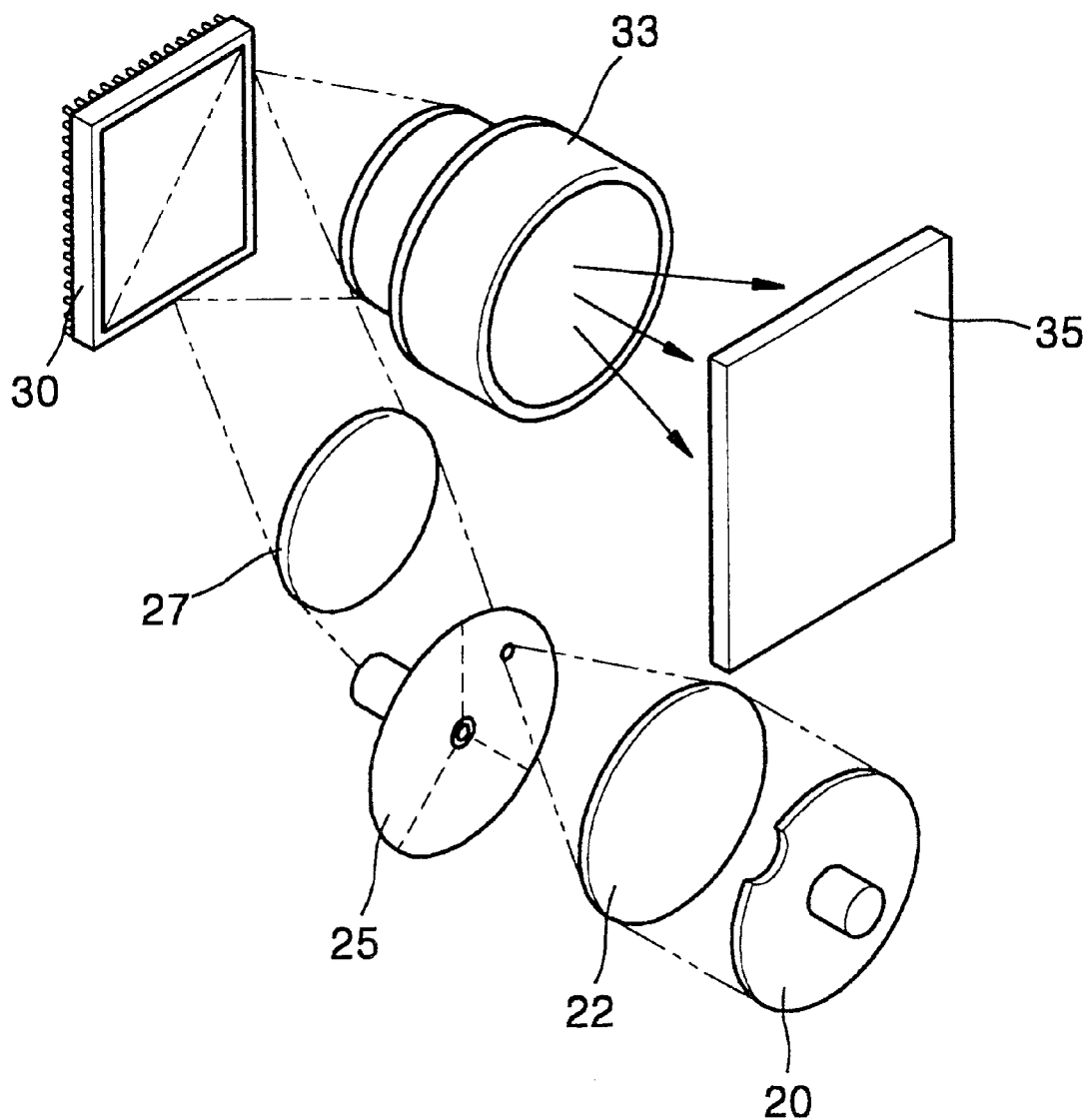
FIG. 2 illustrates a view schematically showing the configuration of a projector employing the conventional micromirror device of FIG. 1.
Figure 3:
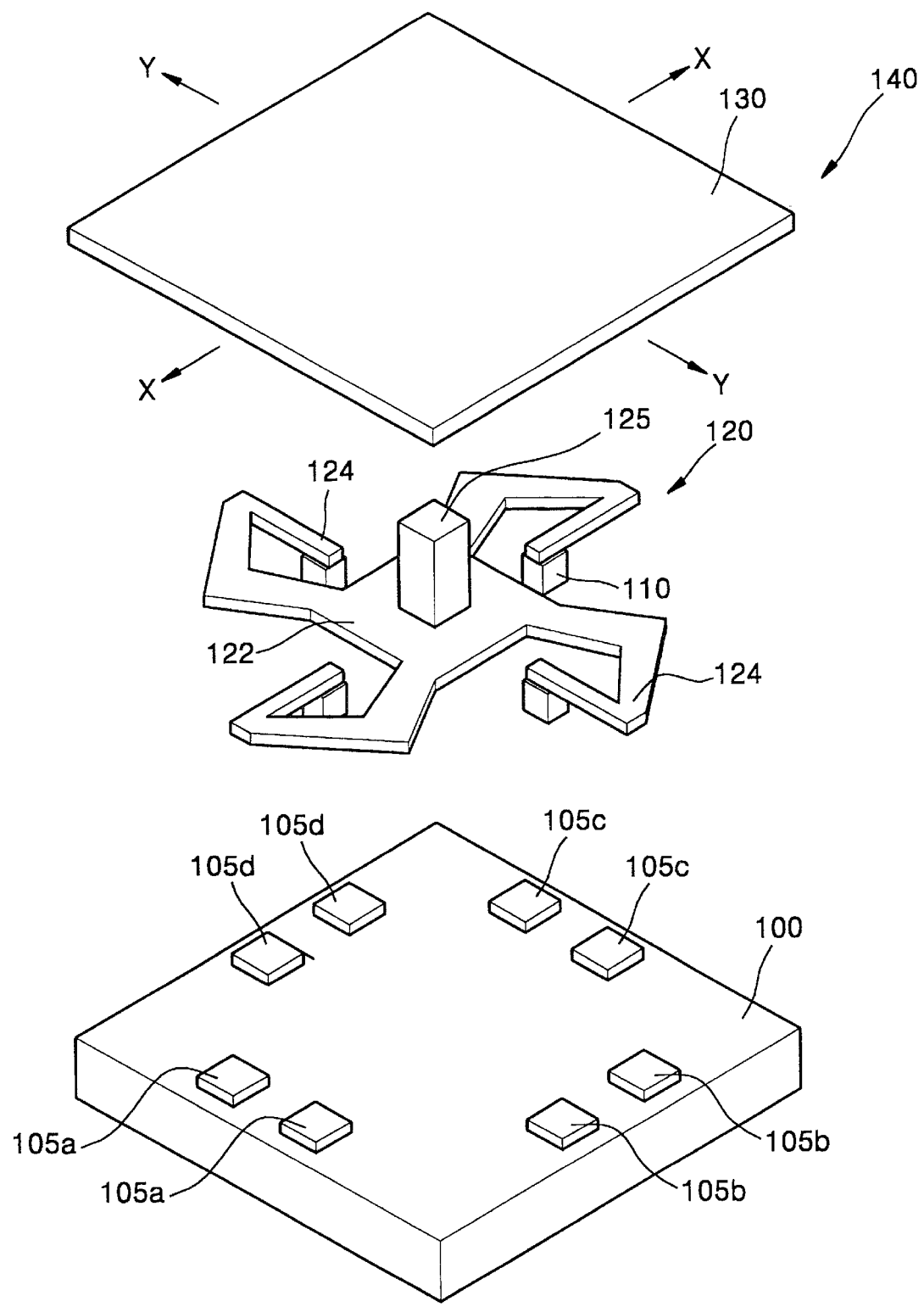
FIG. 3 illustrates an exploded perspective view showing a micromirror device according to the present invention.
Figure 4:
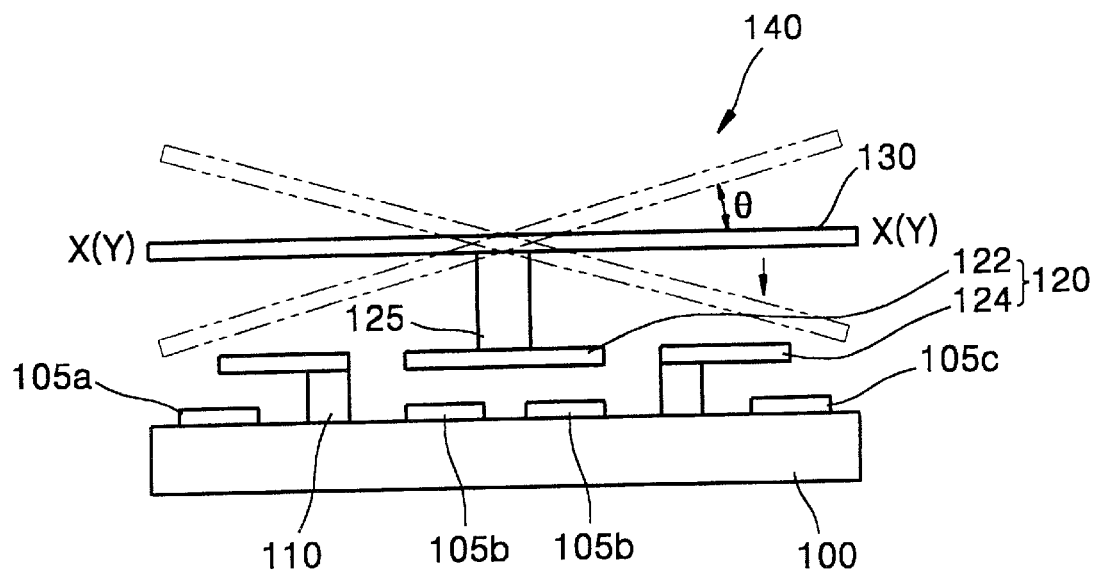
FIG. 4 illustrates a sectional view of the micromirror device according to the present invention.

Referring to FIGS. 3 and 4, a micromirror device 140 according to the present invention, includes a substrate 100, and a plurality of electrodes 105a, 105b, 105c, and 105d on the substrate 100. A support frame 120 is supported by a plurality of first posts 110 and tilts with respect to a plurality of rotation axes by using portions supported by each first post 110 as hinge points. The micromirror device 140 further includes a second post 125 protruding from the support frame 120, and a micromirror 130 supported by the second post 125, to reflect light incident on a surface thereof.

The substrate 100 includes an SRAM, which is connected to each first posts 110. The first posts 110 are electrically connected to the micromirror 130 via the support frame 120 and the second post 125. Thus, when electrical power is supplied from the substrate 100, the electrical power is applied to the micromirror 130 via the first posts 110, the support frame 120, and the second post 125. Also, when a voltage is applied to one of the electrodes 105a, 105b, 105c, and 105d, an electrostatic force is generated between the micromirror 130 and the electrode 105a, 105b, 105c, or 105d to which the voltage is applied, to tilt the micromirror 130.

For illustrative purposes, the electrodes 105a, 105b, 105c, and 105d are symmetrically arranged on four sides of the substrate 100 so that the micromirror 130 can be driven with respect to multiple axes. For example, the micromirror 130 is configured to be capable of tilting with respect to two axes X and Y, which are configured to be perpendicular to each other so that the micromirror 130 can tilt in four directions.

For instance, the micromirror 130 can tilt with respect to an X—X axis by applying the voltage to a pair of electrodes 105b, 105d facing each other and with respect to a Y—Y axis by applying the voltage another pair of electrodes 105a, 105c facing each other. Thus, the micromirror 130 can have a reflection angle in one of four directions. Each of the electrodes 105a, 105b, 105c, and 105d may be a set of two electrodes to prevent unwanted tilting in one direction, when the micromirror 130 tilts due to an asymmetric arrangement of each electrode.

Figure 5:
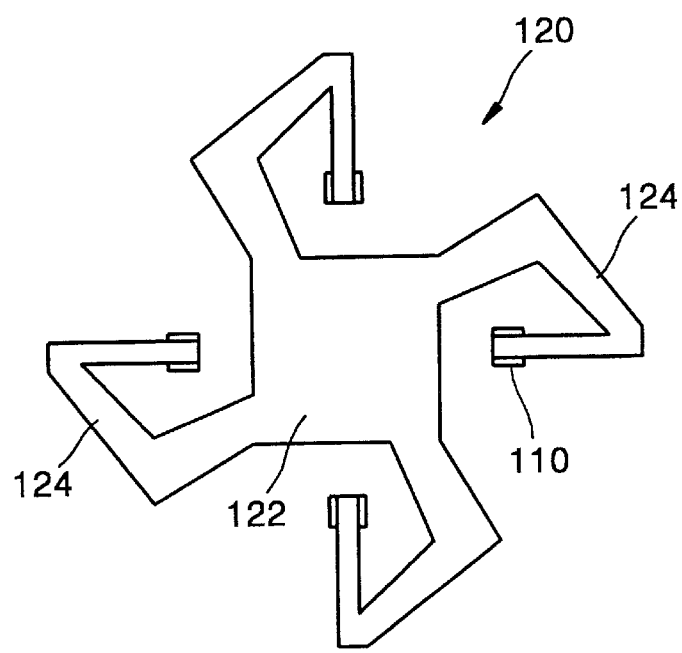
FIG. 5 illustrates a plan view showing a support frame for the micromirror device according to the present invention.

The support frame 120, as shown in FIG. 5, includes a center portion 122 supporting the second post 125 and two pairs of springs 124, each pair symmetrical to each other, connecting the center portion 122 and the first posts 110. The springs 124 are elastically deformed and twisted when the electrostatic force tilts the micromirror 130. Thus, when the electrostatic force tilts the micromirror 130, each pair of springs 124 facing each other along the X—X or Y—Y rotation axis is elastically deformed and twisted. Accordingly, when the electrostatic force is removed, the micromirror 130 is returned to its original state by a restoration force of the springs 124. In this instance, the micromirror 130 tilts until the restoration force and the electrostatic force create a balanced state. An angle and direction of tilt of the micromirror 130 are determined by an amount of voltage applied to an electrode and the particular electrode to which the voltage is applied. The first posts 110 may include at least three posts.

As described above, the micromirror device 140 according to the present invention, may be driven with respect to multiple axes, for instance, with respect to two axes, so that the micromirror 130 can tilt in four directions. Thus, an image is formed on a screen (not shown) by arranging the micromirrors 130 in the micromirror device 140 having the above structure and adjusting the micromirrors 130 to be tilted independently.

In an alternative embodiment of the present invention, the micromirror device 140 for driving the micromirror 130 may include in the substrate 100 an SRAM (static random access memory) (not shown) where information for forming the image is stored. The tilting angle and direction of the micromirror 130 is adjusted according to the image information stored in the SRAM. Three or more posts 110 may be provided on the substrate 100 and the posts 110 would support the support frame 120.

Figure 6:
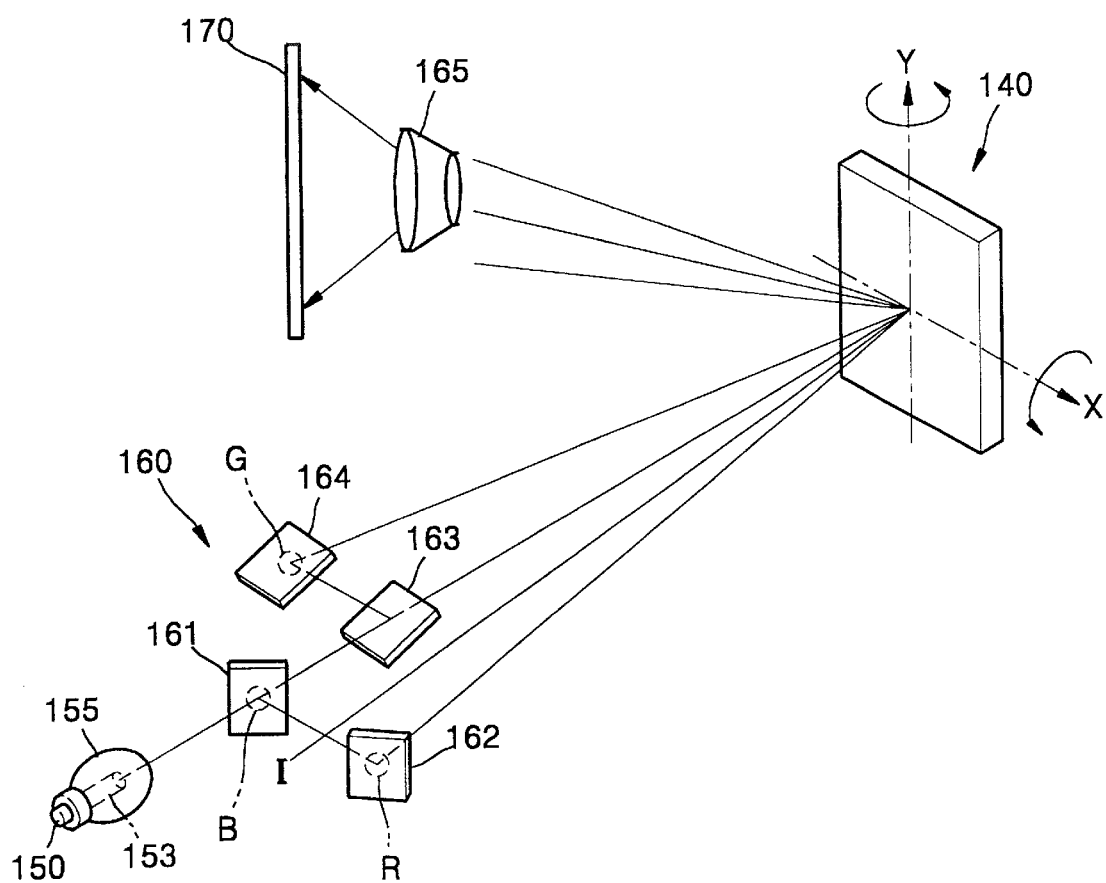
FIG. 6 illustrates a view schematically showing a configuration of a projector employing the micromirror device according to the present invention.

A projector employing the micromirror device having the above structure will now be described with reference to the drawings. Referring to FIG. 6, a projector employing the micromirror device according to the present invention, includes a light source 150 for emitting a light beam and a beam splitting unit 160 for splitting the light beam into red, blue, and green light beams according to a wavelength region of the light beam and transmitting or reflecting the light beam at different angles. A micromirror device 140 guides the red, green, and blue light beams incident on a surface of the micromirror 130 in a proceeding path by focusing and/or diverging the R, G, and B light beam towards a projection lens unit 165. The projection lens unit 165 magnifies and projects the red, green, and blue light beams from the micromirror device 140 towards a screen 170.

The micromirror device 140 changes the proceeding path of the light beam by tilting the micromirror 130 at a predetermined angle (θ). When the micromirror 130 has only one rotation axis, two states of on and off for each color can be selected by the micromirror device 140. However, when there are two rotation axes, as in the present embodiment, because the micromirror 130 can tilt in four directions, for instance, color can be realized left and right and up and down without a color wheel.

The light source 150 includes a lamp 153 for generating the light beam, and a reflection mirror 155 for guiding the light beam in the proceeding path by reflecting the light beam. The reflection mirror 155 may have, for instance, an oval shape having one focal point at a position of the lamp 153 and another focal point at a point where the light beam is focused in the light splitting unit 160. In the alternative, the micromirror device 140, for instance, may include a parabolic mirror having a focal point at the position of the lamp 153, making the light beam emitted from the lamp 153 and reflected by the reflection mirror 155 to be a parallel beam.

The light splitting unit 160 splits the light beam emitted from the light source 150 and reflected by the reflection mirror 155, for instance, into red, green, and blue color light beams according to the wavelength region of the light beam, and includes a first dichromatic mirror 161, a second dichromatic mirror 163, and a pair of first and second total reflection mirrors 162 and 164. For example, the first dichromatic mirror 161, which is a dichromatic mirror for reflecting a red light beam, reflects the light beam in a red (R) wavelength region towards the first total reflection mirror 162 while transmitting the light beam in green (G) and blue (B) wavelength regions or green and blue light beams, respectively. The second dichromatic mirror 163 is, for example, a dichromatic mirror for reflecting the light beam in the green (G) wavelength region and transmitting the light beam in the red (R) and blue (B) wavelength regions. The green and blue light beams transmitted through the first dichromatic mirror 161 are incident upon the second dichromatic mirror 163. Here, the green light beam is reflected towards the second total reflection mirror 164 while the blue light beam passes through the second dichromatic mirror 163.

Thus, the red light beam, green light beam, and blue light beam are input to the micromirror device 140 at different angles by the first total reflection mirror 162, the second total reflection mirror 164, and the second dichromatic mirror 163, respectively. Then, each of the red, green, and blue light beams are selectively input to the projection lens unit 165 according to the different incident angles of each of the red, green, and blue light beams and the tilt angle of the micromirror 130 corresponding to each incident angle, thus realizing color.

Figure 7:
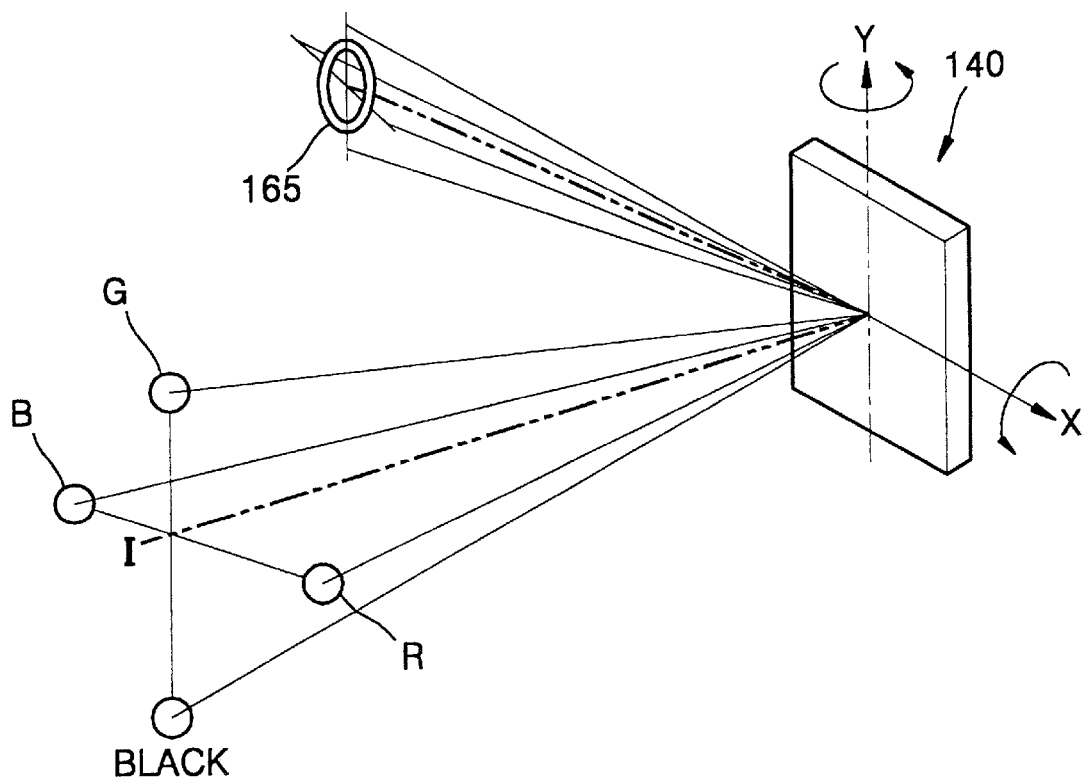
FIG. 7 illustrates a view showing a state in which the micromirror device according to the present invention is not operating.

FIG. 7 illustrates a ready state in which the micromirror device 140 is not operating. Reference characters R, G, and B indicate start points of the light beam reflected by the second dichromatic mirror 163, and the first and second total reflection mirrors 162 and 164, respectively. BLACK indicates a tilt of the micromirror 130 in the micromirror device 140 (not shown) for forming a black image. In the ready state, the micromirror 130 is not tilted with respect to a predetermined reference axis I, and no red, green, and blue light beam is input to the projection lens unit 165.

Figure 8:
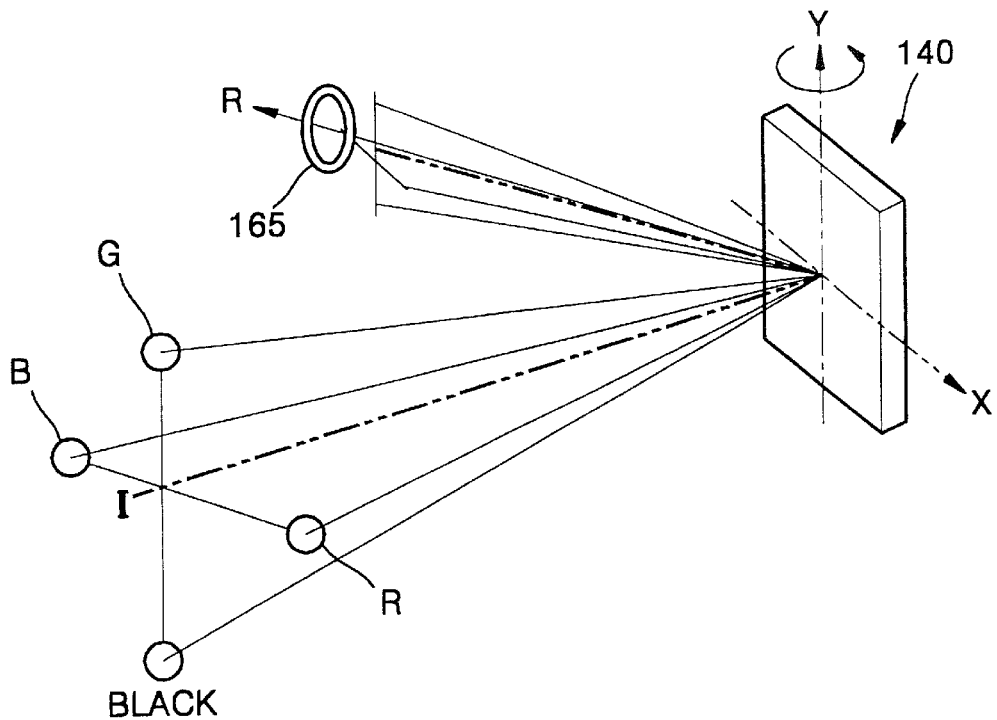
FIG. 8 illustrates a view showing a state in which the micromirror device operates according to the present invention.

As shown in FIG. 8, when the micromirror 130 tilts by pivoting in a direction indicated by an arrow with respect to the Y axis, the red light beam is input to the projection lens unit 165 and the blue and green light beams are directed away from the projection lens unit 165 so that only red color is displayed. Also, when the micromirror 130 tilts in the direction opposite to a direction indicated by an arrow with respect to the Y axis, the blue light beam is input to the projection lens unit 165 and the red and green light beams are directed away from the projection lens unit 165 so that a blue color is displayed.

Figure 9:
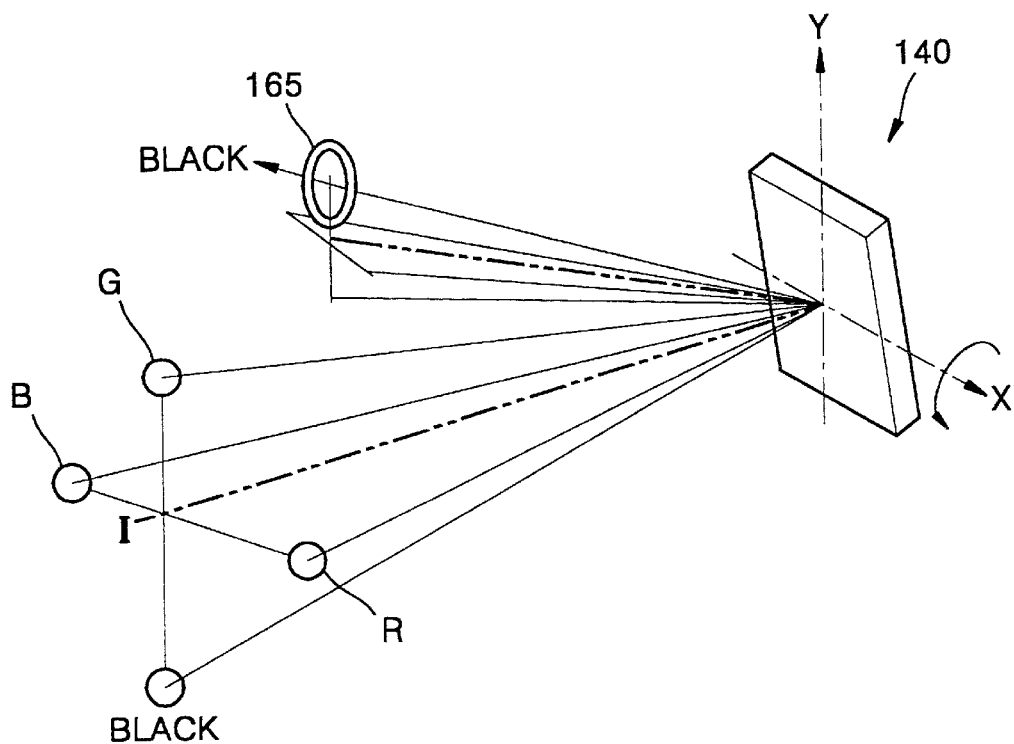
FIG. 9 illustrates a view showing the state in which the micromirror device operates according to the present invention.

As shown in FIG. 9, when the micromirror 130 in the micromirror device 140 (not shown) tilts in a direction indicated by an arrow with respect to the X axis, the R, G, and B light beams are not input to the projection lens unit 165 and no unnecessary surface reflection light is input to the projection lens unit 165 so that a black image is formed. When the micromirror 130 tilts in a direction opposite to the direction indicated by the arrow with respect to the X axis, green color G is displayed.

As described above, in the micromirror device 140 according to the present invention, the micromirror 130 can tilt in four directions by applying a voltage to any one of the electrodes 105a, 105b, 105c, and 105d. Red, green, and blue colors are selectively displayed according to a direction of tilt so that the micromirror device 140 can function as a color switch without a color wheel.

Because the micromirror device 140 according to the present invention and the projector employing the micromirror device 140 are a one panel type and do not need a color wheel, there is no noise in the projector due to the color wheel rotating at high speed, there is no instability in the projector due to mechanical motion, and projection cost is reduced.

Also, in the one panel type, because the red, green, and blue light beams are processed by being modulated in a time sequence, the amount of light beam used by the micromirror device 140 is reduced by ⅓, compared to a 3 panel type. Also, because the red, green, and blue light beams need to be continuously refreshed, a color break phenomenon is severe. However, in the present invention, the amount of light is improved compared to the conventional one panel type. That is, although white color is reduced by ⅓ in the amount of light, which is the same as in the conventional technology, in a case of a single color, the same amount of light as in the 3-panel type can be obtained. In the case of combining two colors, the amount of light is reduced by ⅔ so that brightness is improved compared to the conventional one panel type. Furthermore, because the frequency of refresh is reduced in the present invention, color break phenomenon can be reduced.

While this invention has been particularly shown and described with reference to preferred embodiments thereof, it will be understood by those skilled in the art that various changes in form and details may be made thereto without departing from the spirit and scope of the invention as defined by the appended claims.

What is claimed is:

1. A micromirror device for driving a micromirror, the micromirror device comprising:
   a substrate;
   electrodes on the substrate;
   first posts; and
   a support frame supported by the first posts and tilting with respect to rotation axes using portions supported by each of the first posts as hinge points.

2. The micromirror device as claimed in claim 1, wherein the electrodes are symmetrically arranged in pairs on opposite sides of the substrate, each pair of electrodes facing each other.

3. The micromirror device as claimed in claim 2, wherein each of the electrodes comprises a set of two electrodes.

4. The micromirror device as claimed in claim 2, wherein the micromirror tilts with respect to two rotation axes.

5. The micromirror device as claimed in claim 4, wherein the rotation axes are perpendicular to each other.

6. The micromirror device as claimed in claim 5, wherein the support frame comprises:
   a second post protruding from the support frame supporting the micromirror;
   a center portion supporting the second post; and
   two pairs of springs connecting the first posts with the center portion.

7. The micromirror device as claimed in claim 6, wherein the two pairs of springs are arranged to be symmetrical with respect to each other and have zigzag shapes to be twisted and elastically deformed when the micromirror tilts.

8. The micromirror device as claimed in claim 7, wherein:
   when an electrostatic force tilts the micromirror, each pair of springs facing each other along a rotation axis is elastically deformed and twisted, and
   when the electrostatic force is removed, the micromirror is returned to an original state by a restoration force from each pair of springs.

9. The micromirror device as claimed in claim 1, wherein the support frame comprises:
   a second post protruding from the support frame supporting the micromirror;
   a center portion supporting the second post; and
   two pairs of springs connecting the first posts with the center portion.

10. The micromirror device as claimed in claim 7, wherein:
    the micromirror tilts with respect to an X—X axis by applying a voltage to one of the pairs of electrodes facing each other and with respect to a Y—Y axis by applying the voltage to another of the pairs of electrodes facing each other.

11. The micromirror device as claimed in claim 10, wherein:
    each pair of springs facing each other along the X—X or Y—Y rotation axis is elastically deformed and twisted when an electrostatic force along a corresponding one of the rotation axes tilts the micromirror.

12. The micromirror device as claimed in claim 1, wherein:
    an angle and direction of tilt of the micromirror are determined by an amount of voltage applied to an electrode.

13. The micromirror as claimed in claim 12, wherein the substrate comprises a built-in SRAM and a tilting angle and direction of the micromirror is adjusted according to an image stored in the SRAM.

14. The micromirror device as claimed in claim 1, wherein the first posts comprise at least three posts.

15. The micromirror device as claimed in claim 1, wherein the micromirror tilts with respect to two rotation axes.

16. The micromirror as claimed in claim 1, wherein the substrate comprises an SRAM storing information to form an image.

17. A micromirror device for driving a micromirror, the micromirror device comprising:
    a substrate;
    electrodes on the substrate;
    first posts; and
    a support frame supported by the first posts and tilting with respect to two rotation axes using portions supported by each of the first posts as hinge points, wherein the micromirror device excludes a color wheel.

18. A projector, comprising:
    a light source emitting a light beam;
    a light beam splitting unit splitting the light beam from the light source according to a wavelength region of the light beam and transmitting and/or reflecting the light beam split at different angles;
    micromirrors;
    micromirror devices forming an image by independently pivoting each of the micromirrors in a predetermined direction and angle and controlling the micromirrors to selectively reflect the split light beam, each of the micromirrors tilting with respect to rotation axes;
    a screen; and
    a projection lens unit magnifying and transmitting an incident light beam from the micromirror devices to proceed to the screen to form the image.

19. The projector as claimed in claim 18, wherein each of the micromirror devices comprises:
    a substrate;
    electrodes on the substrate;
    first posts;
    a support frame supported by the first posts and tilting with respect to the rotation axes using portions supported by each of the first posts as hinge points;
    a second post protruding from the support frame; and
    one of the micromirrors supported by the second post and tilting by interaction with the electrodes.

20. The projector as claimed in claim 19, wherein the electrodes are symmetrically arranged in pairs on opposite sides of the substrate, each pair of electrodes facing each other.

21. The projector as claimed in claim 19, wherein the micromirror tilts with respect to two rotation axes.

22. The projector as claimed in claim 21, wherein the rotation axes are perpendicular to each other.

23. The projector as claimed in claim 22, wherein the support frame comprises:
    a center portion supporting the second post; and
    two pairs of springs connecting the first posts with the center portion.

24. The projector as claimed in claim 23, wherein the two pairs of springs are arranged to be symmetrical with respect to each other and have zigzag shapes to be twisted and elastically deformed when the micromirror tilts.

25. The projector device as claimed in claim 21, wherein the support frame comprises:

a center portion supporting the second post; and two pairs of springs connecting the first posts with the center portion.

26. The projector device as claimed in claim 19, wherein the light beam splitting unit splits the light beam from the light source into red, green, and blue light beams.

27. The projector device as claimed in claim 26, wherein:

the micromirror device guides the red, green, and blue light beams incident on a surface of the micromirror on a path and focuses and/or diverges the red, green, and blue light beams towards the projection lens unit, and the projection lens unit magnifies and projects the red, green, and blue light beams from the micromirror device towards the screen.

28. The projector device as claimed in claim 27, wherein:

the micromirror device changes the proceeding path of the light beam by tilting the micromirror at a predetermined angle and excludes a color wheel.

29. The projector device as claimed in claim 26, wherein:

the red light beam comprises a red wavelength region, the blue light beam comprises a blue wavelength region, and the green light beam comprises a green wavelength region.

30. The projector device as claimed in claim 29, wherein the light beam splitting unit comprises:

a first total reflection mirror;

a second total reflection mirror;

a first dichromatic mirror reflecting the red light beam towards the first total reflection mirror and transmitting the green and blue light beams; and a second dichromatic mirror receiving the green and blue light beams from the first dichromatic mirror, reflecting the green light beam towards the second total reflection mirror and transmitting the blue light beam.

31. The projector device as claimed in claim 30, wherein the micromirror device receives the red light beam, the green light beam, and the blue light beam at different incident angles from the first total reflection mirror, the second total reflection mirror, and the second dichromatic mirror, respectively, and selectively outputs each of the red, green, and blue light beams to the projection lens unit according to the incident angles of each of the red, green, and blue light beams and a tilt angle of the micromirror corresponding to each incident angle to realize color.

32. The projector device as claimed in claim 19, wherein the micromirror comprises two rotation axes realizing color left and right and up and down.

33. The projector device as claimed in claim 19, wherein the light source comprises:

a lamp generating the light beam; and a reflection mirror reflecting the light beam, wherein the reflection mirror comprises an oval shape having one focal point at a position of the lamp and another focal point at a point where the light beam is focused in the light beam splitting unit.

34. The projector device as claimed in claim 30, further comprising a parabolic mirror having a focal point at the position of the lamp, making the light beam emitted from the lamp and reflected by the reflection mirror to be a parallel beam.

35. A micromirror device for driving a micromirror, the micromirror device comprising:

a substrate comprising a built-in SRAM;

electrodes on the substrate to tilt the micromirror;

at least three posts on the substrate; and a support frame supported by the posts, wherein the micromirror is tilted in four directions by interaction with the electrodes using portions supported by each of the first posts as hinge points.

36. The micromirror device as claimed in claim 35, wherein the direction of a tilt of the micromirror is independently adjusted by the SRAM.

37. The micromirror device as claimed in claim 36, wherein each of the micromirrors tilts with respect to two rotation axes.

38. The micromirror device as claimed in claim 37, wherein the rotation axes are perpendicular to each other.

39. A micromirror device, comprising:

a micromirror receiving a red light beam, a green light beam, and a blue light beam at different angles, and a projection lens unit selectively receiving and displaying each of the red, green, and blue light beams according to incident angles of each of the red, green, and blue light beams and a tilt angle of the micromirror corresponding to each of the incident angles to realize color.

40. A micromirror device for driving a micromirror, the micromirror device comprising:

a substrate;

electrodes on the substrate; and a support frame supported by tilting with respect to rotation axes, wherein the micromirror tilts in four directions by applying a voltage to any one of the electrodes; and a projection lens unit selectively displaying red, green, and blue colors according to a direction of tilt of the micromirror.

41. The micromirror device claimed in claim 40, wherein the micromirror device excludes a color wheel.

42. The micromirror device as claimed in claim 40, wherein the support frame comprises:

a second post protruding from the support frame supporting the micromirror;

a center portion supporting the second post; and two pairs of springs connecting the first posts with the center portion.

43. The micromirror device as claimed in claim 40, wherein:

when an electrostatic force tilts the micromirror, each pair of springs facing each other along a rotation axis is elastically deformed and twisted; and when the electrostatic force is removed, the micromirror is returned to an original state by a restoration force from each pair of springs.

44. The micromirror device as claimed in claim 40, wherein:

the micromirror tilts with respect to an X—X axis by a pair of electrodes facing each other and with respect to a Y—Y axis by another pair of electrodes facing each other.

45. The micromirror device as claimed in claim 44, wherein:

each pair of springs facing each other along the X—X or Y—Y rotation axis is elastically deformed and twisted when an electrostatic force along a corresponding one of the rotation axes tilts the micromirror.

* * * * *

UNITED STATES PATENT AND TRADEMARK OFFICE
CERTIFICATE OF CORRECTION

PATENT NO. : 6,781,731 B2 Page 1 of 1
APPLICATION NO. : 09/962311
DATED : August 24, 2004
INVENTOR(S) : Soon-cheol Choi It is certified that error appears in the above-identified patent and that said Letters Patent is hereby corrected as shown below:

in Item (56) References Cited, Foreign Patent Documents, insert the following references:

JP 2002-156592 5/2002
JP 2002-189176 7/2002

Signed and Sealed this

Fifth Day of September, 2006

JON W. DUDAS
*Director of the United States Patent and Trademark Office*